United States Patent [19]
Davidsohn et al.

[11] Patent Number: 5,606,361
[45] Date of Patent: Feb. 25, 1997

[54] VIDEOPHONE INTERACTIVE MAILBOX FACILITY SYSTEM AND METHOD OF PROCESSING INFORMATION

[76] Inventors: John Davidsohn, 7 S. Hollow Rd., Dix Hills, N.Y. 11746; Anthony Cinotti, 410 Hillside Ave., Mahwah, N.J. 07430

[21] Appl. No.: 438,892

[22] Filed: May 10, 1995

[51] Int. Cl.$^6$ .............................. H04N 11/00; H04N 7/12
[52] U.S. Cl. ................................. 348/14; 379/96; 364/226
[58] Field of Search .................... 348/14–20; 379/93–99, 379/90, 91; 364/401, 405

[56] References Cited

U.S. PATENT DOCUMENTS

| | | |
|---|---|---|
| 4,645,873 | 2/1987 | Chomet . |
| 4,707,592 | 11/1987 | Ware . |
| 4,734,858 | 3/1988 | Schlafly . |
| 4,788,682 | 11/1988 | Vij et al. . |
| 4,845,636 | 7/1989 | Walker ...................................... 379/90 |
| 4,860,123 | 8/1989 | McCalley . |
| 4,897,865 | 1/1990 | Canuel . |
| 4,943,995 | 7/1990 | Daudelin et al. . |
| 5,062,136 | 10/1991 | Gattis et al. .............................. 379/90 |
| 5,089,954 | 2/1992 | Rago . |
| 5,283,731 | 2/1994 | Lalonde et al. . |
| 5,311,302 | 5/1994 | Berry et al. . |
| 5,325,423 | 6/1994 | Lewis . |
| 5,365,577 | 11/1994 | Davis et al. .............................. 379/96 |
| 5,416,831 | 5/1995 | Chewning, III et al. ................. 379/97 |
| 5,448,285 | 9/1995 | Kadowaki ................................. 379/96 |
| 5,450,123 | 9/1995 | Smith ....................................... 379/96 |

*Primary Examiner*—Wing F. Chan
*Attorney, Agent, or Firm*—Ezra Sutton

[57] ABSTRACT

A videophone interactive mailbox facility system for processing of information to conduct a transaction which includes a user station, a vendor station, and a central data center. The user station has a videophone for viewing information sent or received to conduct a transaction; an encryption encoder and a decryption decoder for safeguarding the information sent or received; and a touch pad for inputting the information into the videophone. The vendor station has a computer for the transmission and receipt of vendor-type information to or from the central data center for conducting a transaction; and an encryption encoder and a decryption decoder for message privacy and transaction authentication of the information sent or received. The central data center is electronically connected to the user station and to the vendor station and includes a computer processor for centralized transmitting, receipt of and storage of all information and transactions with the user station and the vendor station. The computer is electronically connected to one or more telephones and includes a display screen for monitoring the transactions. Also included is an encryption encoder and a decryption decoder for authentication of the information sent or received, and a network interface for electronically connecting and making compatible the computer used by the vendor station.

9 Claims, 7 Drawing Sheets

VIDEOPHONE INTERACTIVE MAILBOX FACILITY SYSTEM AND METHOD OF PROCESSING INFORMATION

FIELD OF THE INVENTION

This invention relates to a videophone interactive mailbox facility system, wherein the system has a videophone, a printer, a computer, and a central data center for processing information from a plurality of stations for purchasers and sellers.

BACKGROUND OF THE INVENTION

At present, there are many known audio and video presentation interactive network systems where a subscriber can buy products and/or services with the aid of the subscriber's telephone and cable television system. Lists and pictures of products or services are presented on the subscriber's television screen. The subscriber then selects what he/she wishes to purchase by pressing selected keys on the subscriber's telephone.

In another type of interactive network system, the subscriber can purchase products or services with the use of the subscriber's telephone and personal computer in conjunction with an interactive cable television system that distributes information to the subscriber's television at their request. This system provides a shopping service where subscribers shop at home through an electronic mail process. This system allows subscribers to select which products and services they will view on their televisions by the use of their own telephone and/or computer.

The problems inherent with the above audio/video interactive network systems are that the subscriber's interaction with the cable television system or computer system is limited mainly to the subscriber's one-way input of data to the interactive system by phone or personal computer. These systems do not provide for an immediate confirmation of an order and do not provide proper security to the transactions carried out.

It would be highly desirable to provide an interactive mailbox facility system having built-in security safeguards, a videophone with a printer for the subscriber's use, and a central data center computer for processing and dispensing information to and from a plurality of stations for both purchasers and sellers.

DESCRIPTION OF THE PRIOR ART

Audio/video interactive network systems in conjunction with a cable television network system or centralized computer system have been disclosed in the prior art. For example, U.S. Pat. No. 4,645,873 discloses a system for allowing subscribers to make purchases and pay for them, access electronic mail, or access classified ads. Each subscriber employs a personal computer and a modem and communicates with a central computer over the telephone lines.

U.S. Pat. No. 4,734,858 discloses a system for allowing consumers to place orders using hand-held data terminals having visual displays connected by telephone lines to a processing center.

U.S. Pat. No. 4,860,123 discloses a system for buying of goods or services, where a customer employs his personal computer in combination with his phone and television to view on his television a video conveyed by the vendor, through a main computer network center, wherein the video shows the goods or services being offered for sale.

U.S. Pat. No. 4,943,995 discloses a telemarketing system which provides vendor information services and products in response to telephone-customer initiated inquiries. The system allows customers to use their telephones to call a data center through a voice and data-switching network and includes database systems and vendor PCs.

U.S. Pat. No. 5,311,302 discloses a video entertainment and data-management system for passengers on aircraft. The system employs the use of a video terminal having a video LCD display screen at the customer location, a video tape player, a telephone, headphones, and a digital ROM processor. The customer can select the type of service wanted by touching the touch panel on the LCD display screen for entertainment, food/drink select, on-board sales, or telephone.

U.S. Pat. No. 5,325,423 discloses an interactive multimedia communication system like a "home shopping network" that can be utilized with a telephone network, a switching network, a broadcast network, such as a satellite or cable system, for the selling of goods, audio information, such as news, weather, etc., products, services, etc., and by a subscriber or user.

None of the aforementioned patents disclose a videophone interactive mailbox facility system having security safeguards as provided for in the present invention.

Accordingly, the primary object of the present invention is to provide a videophone interactive mailbox facility system that allows the user to view products and services on a videophone that is easier and faster to use, less expensive than a personal computer, and also more user-friendly than a personal computer.

Another object of the present invention is to provide to the end users a functionality of application and equipment they desire, without undue complexity of learning to use a particular application and equipment for the network system.

Another object of the present invention is to provide various vendor applications databases and the incorporation of new vendor applications which can be continuously and easily expanded, on an ongoing basis, at the network system's data center with information supplied by the vendor.

Another object of the present invention is to provide the capability of network system expansion without adding to the network system's hardware at the data center already in place; and without any additional burden placed on the user to use or learn the network system.

Another object of the present invention is to provide a network system with security safeguards that protect against embezzlement, fraud, and theft of services for all parties involved in the network system's day-to-day transactions and operations.

Another object of the present invention is to provide a network system that has state-of-the-art security safeguards for message privacy and transaction authentication by using encryption and decryption algorithms and cipher microchips in hardware used by the vendor, the data center, and the subscriber.

A further object of the present invention is to provide for a network system that has worldwide application in all of its uses for the subscribers and the vendors.

SUMMARY OF THE INVENTION

The present invention provides a videophone interactive mailbox facility and processing method. The videophone mailbox is designed to be used as a storage facility for the storage of video/voice and/or video/text images. These images contain phone messages utilizing videophones or computer-generated video/voice or video/text messages.

The interactive capability is designed to facilitate the use of video/voice and/or video/text for the use of the general population to view and hear the videophone messages for purposes of general conversations, objects of art, homes, contracts, confirms, pictures of vacation resorts, pictures of general interests, and all items offered for sale through mail order and/or department stores, car dealers, real estate operations, financial institutions, video stores, airline reservations, restaurants, hotels, and all operations that are in the business of selling objects of interests or services to the private or public sector having something to sell utilizing a videophone mailbox interactive facility system.

The videophone mailbox speeds the ability of that user to respond interactively by the very nature of video images and the voice/text messages to purchase or to place a down payment for the object of interest or service that was placed in the videophone mailbox by a company for the purpose of selling their services or objects of interests and which the user thereby decided to buy based on his ability to view and/or hear the associated sales presentation on the videophone mailbox.

The process of this invention interacts with the user by providing the computer facility and design of computer programs that contain all the relevant information which was provided to a data center by the user of the videophone mailbox that will allow him to transfer funds electronically from the financial institution of his choice to the recipient of the electronic funds.

The user's PIN (private identification number) is encrypted for purposes of authentication of the user's interactive responses which will provide the safety and privacy of the user's account at the financial institution or institutions, thereby allowing the user to select one of many institutions the user deals with.

The data center archives all messages that the user generates and the data center will decide if the messages of the sender, such as confirms for affirmation by the user, and the user's responses to electronically transfer funds for immediate payment are archived for historic purposes and provide the audit trail necessary for regulatory agencies.

The data center has the programs that provides the user with the ability to affirm or disaffirm a contract and to generate an authenticated electronic funds transfer message with copies to the financial institution that effects the electronic funds transfer and the corporation or company which is to receive the electronic funds transferred.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein:

FIG. 5 is a schematic representation of the general information flow showing the encryption and decryption of text at each station.

DETAILED DESCRIPTION OF THE PREFERRED INVENTION

Figure 1:
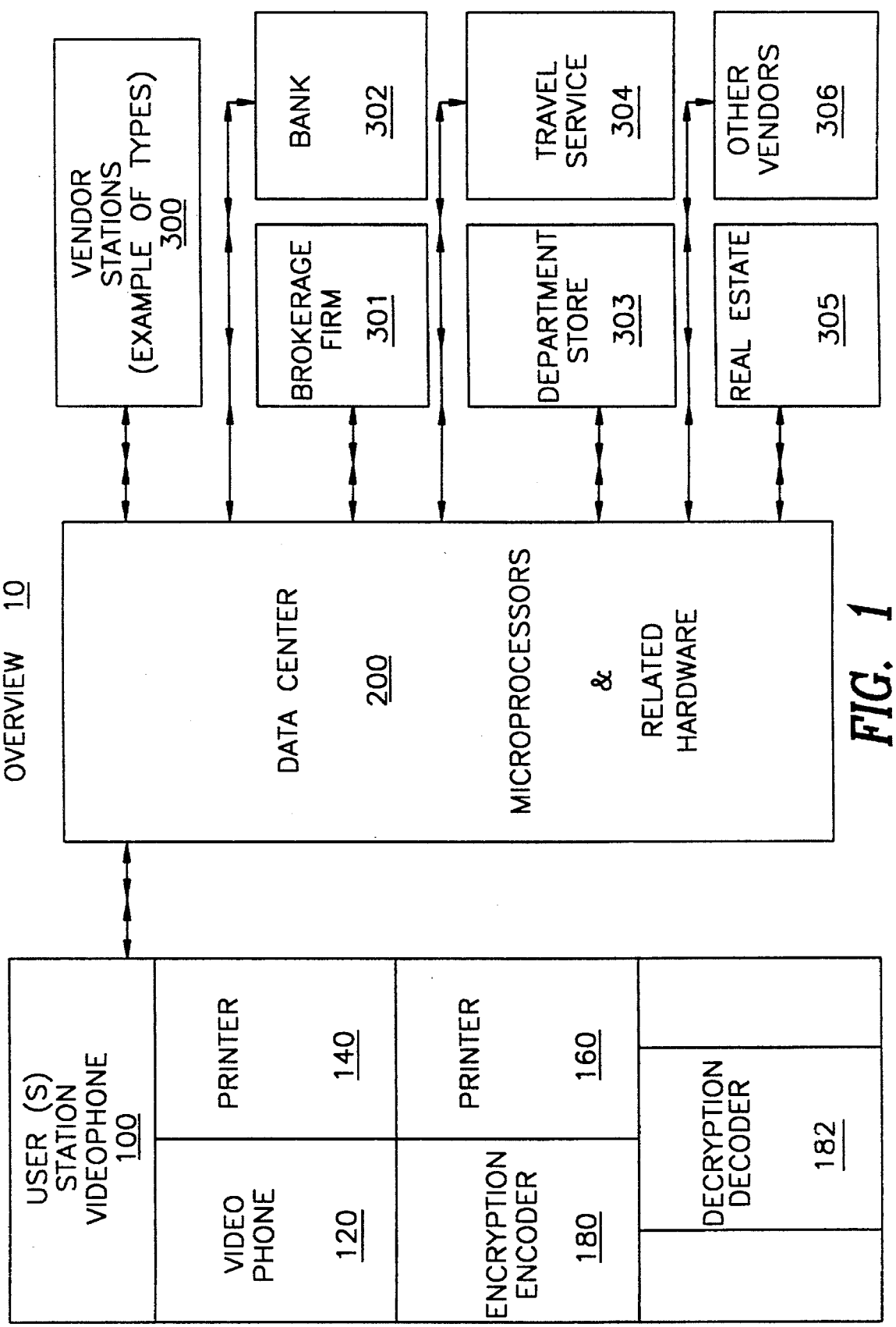
FIG. 1 is a schematic representation of the present invention of the videophone interactive mailbox facility system showing the three interconnected interactive systems, being the user(s) station(s); data center; and vendor station(s), which gives an overview of the system.

The videophone interactive mailbox facility system 10 and the component parts of the present invention are represented in FIGS. 1 to 4. As shown in FIG. 1, the videophone system 10 comprises a plurality of user stations 100, a central data center 200, and a plurality of vendor stations 300.

Figure 4:
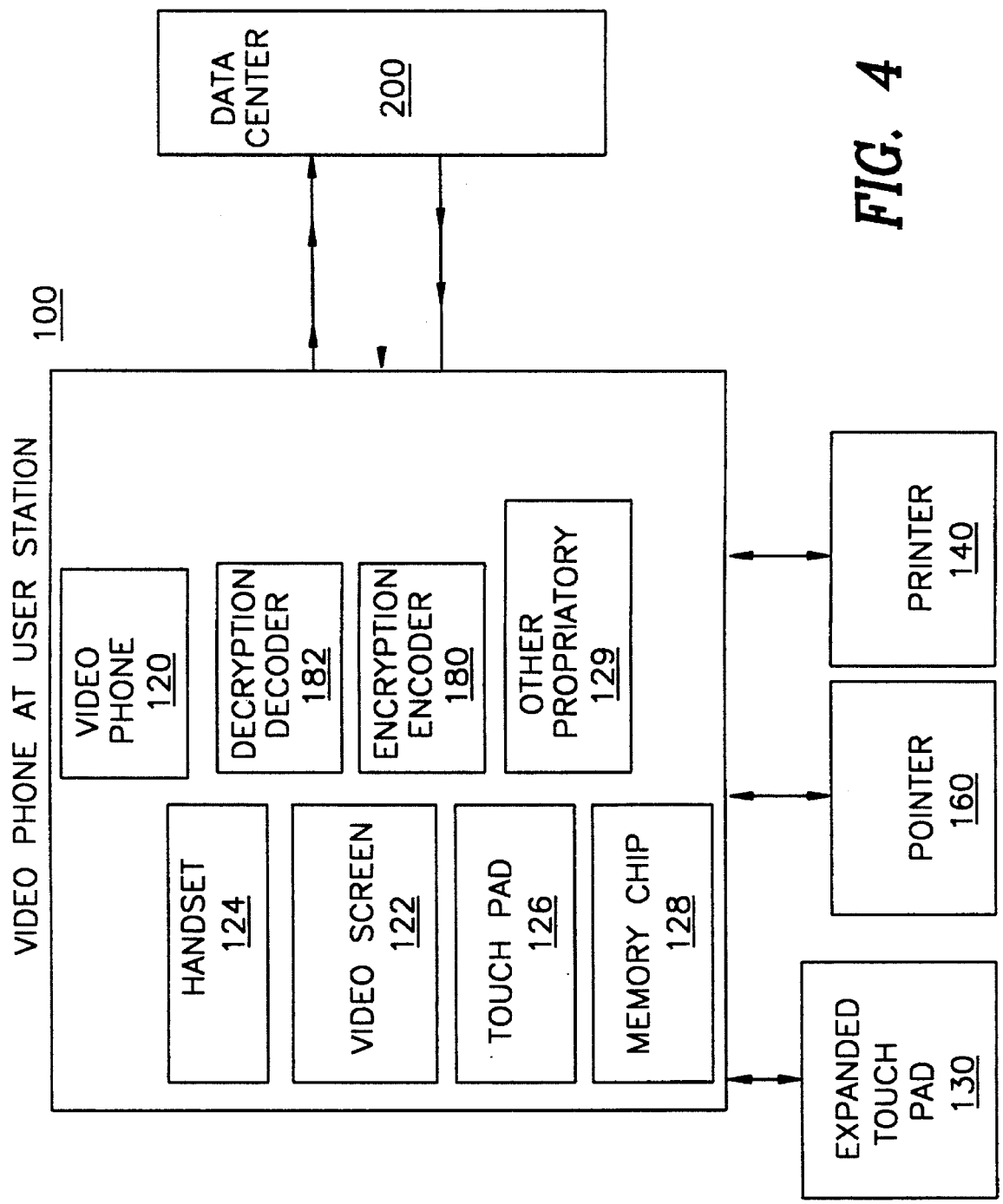
FIG. 4 is a schematic representation of the videophone system being used at the user station with all major components being shown.

Each user station 100, as depicted in FIG. 4, includes a videophone 120 having a video screen 122, a handset 124, pushbuttons 126 for dialing, a memory chip 128, and a telephone line. Connected to the videophone 120 is a printer 140 for printing hard copies of transactions or receipts for products and services, a screen pointer 160 for transactions on videoscreen 122, and an encryption encoder microchip 180 and decoder 182 for message privacy and transaction authentication.

Figure 2:
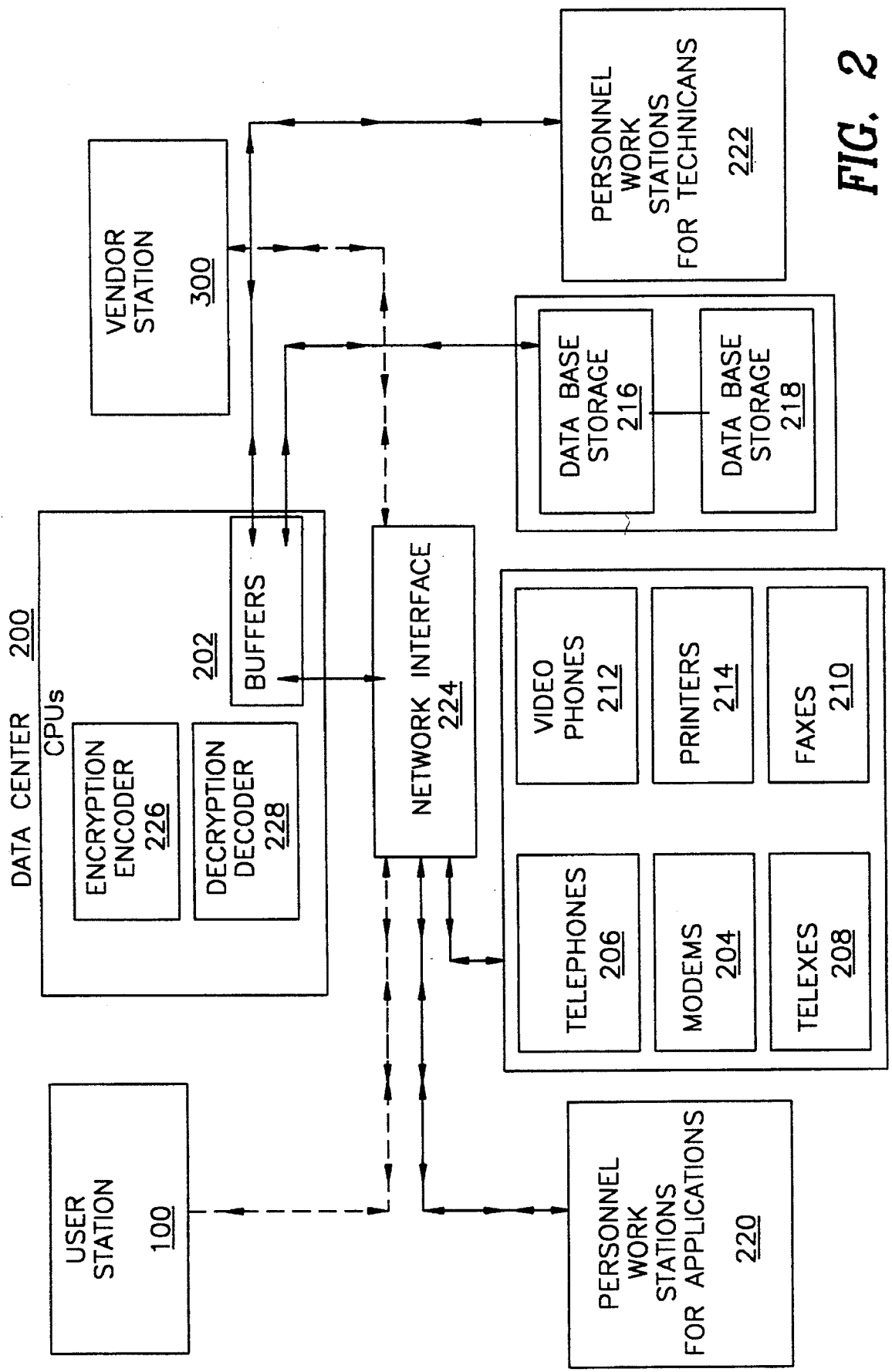
FIG. 2 is a schematic representation of the data center system with all major components being shown.

As shown in detail in FIG. 2, the data center 200 includes a mainframe computer microprocessor 202 electronically connected to conventional or state-of-the-art modems 204, telephones 206, telexes 208, faxes 210, videophones 212, and printers 214 for communication with the users at the user stations 100, and vendors at the vendor stations 300 via the mainframe microprocessor 202. Also connected to the mainframe microprocessor 202 are a plurality of personnel workstations 220 and 222.

Personnel work stations 220 interface with the various vendor stations 300 to input to microprocessor 202 the vendor data and other information for a particular vendor matter. The other personnel work stations 222 interface with the staff of data center 200 in the handling of technical hardware problems and writing and formatting of software applications for the microprocessor 202.

In addition, microprocessor 202 is electronically connected to a database storage center 216 having all of the file information for the various vendors and user subscribers of videophone system 10. Also, electronically connected to microprocessor 202 is a video storage center 218 having all of the video film/video text that is supplied by the various vendor stations 300 using the videophone system 10. The videophones 212 used at the data center 200 are able to review all incoming video film and/or text from the various vendor stations 300.

Other related components connected to microprocessor 202 are a network interface 224 for making compatible the various vendor hardware and software systems with microprocessor 202. In addition, there are encryption/decryption microchips 226 and 228 electronically connected to the microprocessor 202 for continuing security safeguards for message privacy and transaction authentication between user stations 100, the data center 200, and the vendor stations 300.

Figure 3:
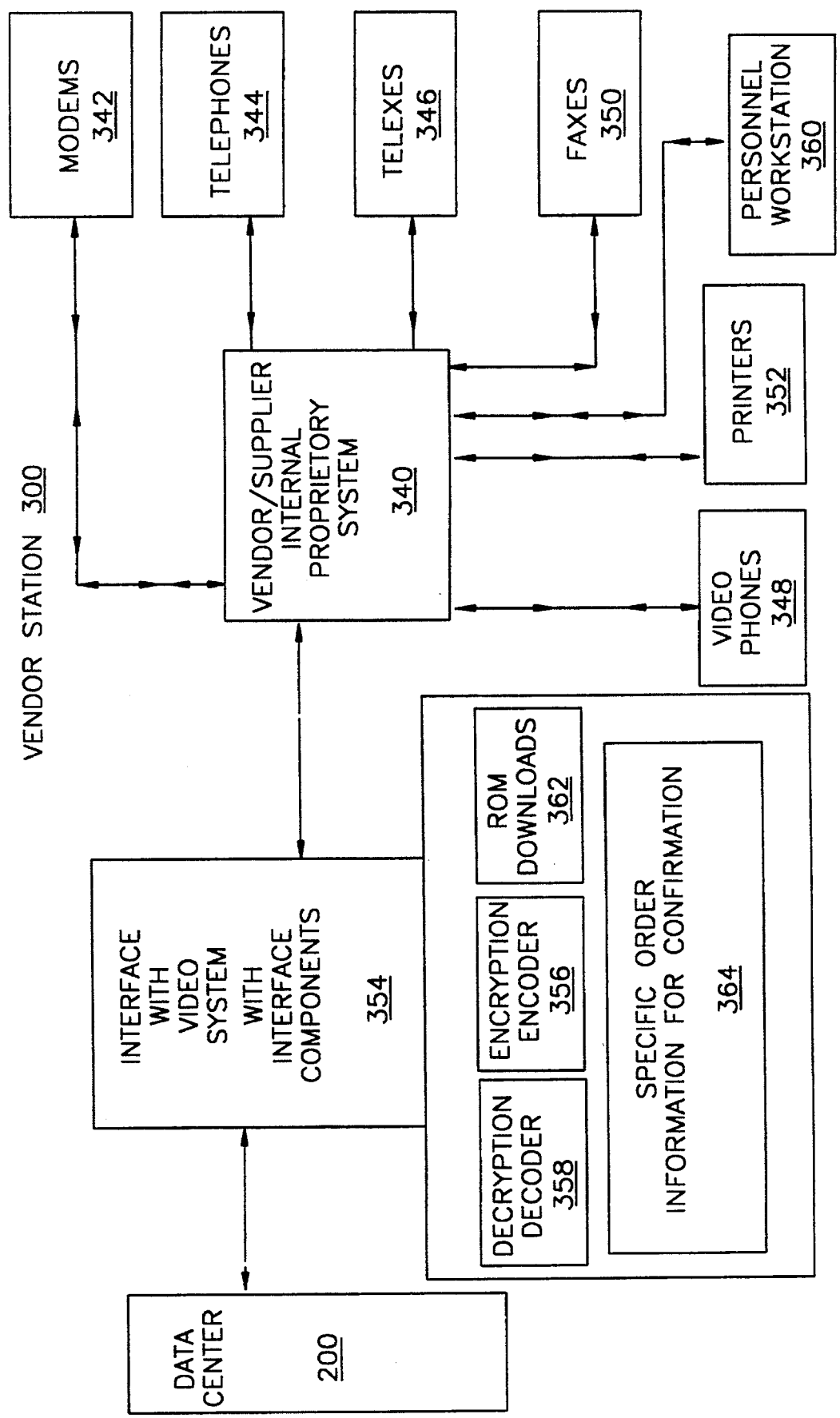
FIG. 3 is a schematic representation of the vendor station with all major components being shown.

As shown in FIGS. 2 and 3, the videophone mailbox facility system 10 has various vendor stations 300, such as a bank firm 302, a department store 303, and a travel service agency 304. Other vendor stations not shown in this embodiment can be included, such as healthcare institutions, food markets, sport/entertainment activities, insurance offerings, and the offering for sale of virtually any product or service. Each vendor station 300 has included in it one or more PCs 340 electronically connected to conventional or state-of-the-art modems 342, telephones 344, telexes 346, videophones 348, faxes 350, printers 352, interfaces 354 for connecting the vendor system to the data center 200, and encryption encoders/decoders 356 and 358. The PCs 340 are also connected to one or more personnel work stations 360 having vendor staff which performs the entering of data and information files to the vendor system 300 and which conveys those files, information, and data to the data center 200 via a ROM downloading system 362.

OVERVIEW OF THE OPERATION FOR THE PRESENT INVENTION

The present invention has many practical uses and applications, such that the user of a videophone interactive mailbox facility 10 can interact with financial institutions, including brokerage firms, banks, and lending institutions; with commercial companies, such as department stores, mail order firms, travel agencies, food market chains, etc.; and with healthcare institutions, such as hospitals, healthcare clinics, nursing homes, etc.

Accordingly, the primary innovative feature of the present invention is that it provides for a videophone interactive mailbox facility system that allows the user to view products and services; review letters, bills, and payments for services/products which can be viewed on the videophone screen, such that the user can review the pertinent information and immediately decide if it is correct and then transmit the appropriate letter, bill, and/or payment for services or products.

Another feature of the present invention is that it provides for an internationally secure network for investment with banking firms using the videophone system. It uses all internationally-accepted standards that are commonly practiced accepted around the world, such that the equipment utilization has a proven record of international viability in terms of security safeguards, reliability, certification, and consumer acceptance.

EXAMPLE NO. 1 FINANCIAL INSTITUTIONS

The following is an example of how the system of the present invention is applied to a financial transaction involving the purchase and sale of shares of stock between a user and a brokerage firm, with a payment through a bank or other payor. The user would initially enter the system 10 by the expanded touch pad 130 which activates the system to a main menu, as shown by Screen Nos. 1-1 and 1-2. The user would depress the 01 key to get into the videophone interactive mailbox. The following (Screen No. 1-3) is the next display that would appear on the user's videophone screen. The user is supplied information in the form of video messages by a sequence number, date, time, message-type, and note.

---
SCREEN NO. 1 - 1
---
Index page 1 of 2

Welcome To Main Menu
Select choice of interest by entering the number followed by the "*"
01 Videophone Interactive Mailbox
02 Department Stores ---
-continued
SCREEN NO. 1 - 1
---

03 Resorts
04 Real Estate
05 Jewelry Stores
06 Catalogues
07 Phone number directories
08 Computer Supplies
09 Airline Schedules and Reservations
10 Restaurants and/or Reservations
Enter Number __
Depress * to Enter      Go to Next Page - Press ***

---
SCREEN NO. 1 - 2
---
Index page 2 Of 2

Welcome To Main Menu
11 Restaurant Delivery Services
12 Hotels/Motels Cities and Reservations
13 Theater schedules and ticket information
14 Supermarket Shopping
15 Overnight Pickup/Delivery Services
16 Automobile Repair Services
17 Music Instruments Purchase/Rentals
18 Power Tool Rentals
19 Ice Rinks, Schedules, Supplies
20 Taxi and Limousine Services
Enter Number __
Depress * to Enter.      Go to previous menu enter #

---
SCREEN NO. 1 - 3
---

VIDEOPHONE MAILBOX INTERACTIVE FACILITY
Welcome Mr. Smith:
Select item by pressing the appropriate number keys followed by *
01. ☐ 01/04/95 1:35 pm Broker Confirmation
02. ☐ 01/04/95 1:49 pm Broker Confirmation
03. ☐ 01/04/95 2:55 pm Financial Report      Requested 01/12/95
04. ☐ 01/04/95 2:59 pm Financial Report      Requested 01/12/95
05. ☐ 01/04/95 3:00 pm Account Status Report      Requested 01/12/95
To Open Message Enter 2 Digit Number
Depress *. to Select
To View Additional Messages On The Next Page Press The '#' Key
To View Previous Screen Press The Zero '0' Than '#' Keys
or ### to return Main Menu

---

The menu on the above display (Screen No. 1-3) is presented to the user after the user utilizes the videophone and dials the phone number assigned to him. To access the videophone interactive mailbox facility, he must enter his PIN number and key authentication.

The number of messages and message type/types could exceed the one screen display. As described in the screen display, the user will have the ability to scroll the following screens to view all the messages he has received. This will allow him to select the message type he wishes to view in the sequence of his choice.

The numeric keys representing the message sequence number plus the month, day, year (010495) followed by the asterisk(*) will execute his request.

The scroll facility will allow him to scroll forward and backwards. The zero(0) and pound(#) keys will allow him to scroll backwards. The pound(#) key will allow him to scroll forward.

After he views his messages, the screen with the original menu will display the disposition of the message type. The profile on the system will provide the automatic archive of the message as provided by the company who has contracted with the data center when the customer's profile is initially generated.

Upon entering his selection, the image is displayed. The image displayed could also contain computer-generated speech or speech spoken by a person generated when the image was captured. The customer will make that determination based on their needs.

The next step is the trade confirmation, which is represented in the display of Screen No. 1-4, as shown below. The client requested message number 01 010495, which is a broker confirmation. The confirm image is displayed on the videophone for the client to review. The client is requested to press keys 1* or if incorrect 9*.

---

SCREEN NO. 1 - 4

---

VMIF
MSG 01. ☐ 01/04/95 1:35 pm BROKER CONFIRMATION
Trade Ref: 012657004 Best Broker & Co. Incorporated
Exec Broker 0161 Contra Broker 0050
Action: BUY Unsolicited Amount: 100 Shares Price: 68⅛
Security International Business Machines CUSIP No.:
135698-10-1
Additional descriptive information as required by law
Account/Type: Margin - 003-123456-1 Trade Date: 01/04/95 Settle Date: 01/11/95

| Account Info: | Trade Information | |
|---|---|---|
| Mr. John Smith | Commission | 25.00 |
| 12 Gold Street Drive | Principal Amt | 6,812.50 |
| Dix Hills, New York 11746 | Net Amount | $6,837.50 |
| If Correct Press 1* | Enter '#' To Scroll Forward. | |
| If Incorrect Press 9* | Enter '0#' To Scroll To Previous Screen. | |

*Note If You Do Not Respond A Message To The Institution Is Generated advising That You Have Reviewed This Confirm And No Additional Action Was Taken

---

If 1* is the response, the next screen displayed (see Screen No. 1-5) is a screen format that will request the transfer of electronic same-day funds from the user's account to the brokers on or before the settlement date.

---

SCREEN NO. 1 - 5

---

VMIF
Incorrect Reply-1
MSG 01. ☐ 01/04/95 1:35 pm Broker Confirmation
REPLY: CONFIRMATION INCORRECT Trade Reference:
012657004
Dear Mr. Smith.
Please read the following for your response of CONFIRM INCORRECT.
You have responded with a 9*. This means some part of the trade described for the above referenced transaction is incorrect and not acceptable to you.
On the following pages we have tried to provide all possible reasons why a trade is not accurate. Please depress the two number keys that places an asterisk next to the corrosponding error description.
You may enter as many two digit codes for multiple errors as you wish.
If the reason is not on the following screens please request a broker representative to contact you (key 24 or 25) to help resolve the error.
This message will reach the firm that handled your order as soon as your reply is completed.
Press '#' to see next screen
Press 0# to view only the previous screen
Press '#*' to return to confirm screen to change trade reply to CORRECT

---

If the response is 9*, the next screen displayed (see Screen No. 1-6) is a request to the user to enter an asterisk next to the possible reasons by depressing the two keys for the numbers listed for as many times that the user finds to having multiple errors, so that a reply to the broker will enable the broker to cancel and correct or just cancel, based on the user's response, enabling the financial institution to address and correct all the errors, so that a minimum amount of time passes for a corrected order to reach the user, further reducing the financial institution's exposure.

The word "user" includes any one individual, any number of individuals, and any company (other financial institutions, trust companies, investment advisors, custodians, etc.).

---

SCREEN NO. 1 - 6

---

VMIF
Incorrect Reply - 2
MSG 01. ☐ 01/04/95 1:35 pm Broker Confirmation
REPLY: CONFIRMATION INCORRECT Trade Reference:
012657004
The Following Reason Or Reasons The Confirm Is Incorrect.
Enter keys ___
01 Price
02 Quantity
03 Security
04 Trailer Information
05 Trade Date
06 Settlement Date
07 You Did Not Order Any Trade
08 Your Name And/Or Address Is Incorrect
09 Currency
10 You Ordered A Sale
11 You Ordered A Buy
12 You Ordered A Short Sale
Press '#' To See Next Screen - CONTINUE
Press 0# To See Previous Screen
Press '#*' To Return To Confirm Screen To Change Trade Reply To CORRECT

---

The next screen displayed (see Screen No. 1-7) is the broker confirmation "Page 2" of the transaction that has just occurred, which is a continuation forward scrolling of the previous screen display (Screen No. 1-6).

---

SCREEN NO. 1 - 7

---

VMIF
Incorrect Reply - 3
MSG 01. 01/04/95 1:35 pm Broker Confirmation
REPLY: CONFIRMATION INCORRECT Trade Reference:
012657004
The Following Reason Or Reasons The Confirm Is Incorrect.
(Continued)
13 Account Number
14 Incorrect Registered Rep
15 Incorrect Type Of Account
16 Should Be A Margin Type
17 Should Be A Cash Type Account
18 Should Be A COD Type Account
19 Incorrect Commission
20 Incorrect Interest Amount
21 Net Amount Is Incorrect
22 Other Money Field
23 Depress Keys That Match Money Amount $__
24 You Are Not Sure. You Request Your Representative To Call.
25 Trade Incorrect But Reason Is Non Of The Above.
Enter ** if all reasons are entered.
Enter your PIN number __ Press **
Return to Main Menu by Depressing ##
Press 0# To See Previous Screen
Press '#*' To Return To Confirm Screen To Change Trade Reply To CORRECT The next step of the stock transaction is the payment for the stock by an electronic funds transfer by a bank. The following screen displays (see Screen Nos. 1-8 and 1-9) show the cash movement transaction.

---

SCREEN NO. 1 - 8

---

VMIF
Correct Reply - 1

ELECTRONIC FUNDS TRANSFER
FOR REFERENCE NUMBER 012657004
Cash Movement Transaction
Input Date: MM/DD/YY Settlement Date: 01/11/95
Type: Please remit
Chose source of payment:
01 For Bank Of New York
02 For Chemical Bank
03 For Bank Of Montreal
04 Cash On Account At Best & Company
05 Sell Money Market
These Sources Are Listed On Your Profile.
Please Select One By Entering The Number To The Left Of The Bank Name.
You Selected 01 Bank Of New York
If Correct Enter a '5*'
If Not Correct Enter a '*' And Retry Your Response.
Account Number 630033587 (Generated By Data Center From Client Profile)

---

SCREEN NO. 1 - 9

---

VMIF
Correct Reply - 2

CONTINUED
ELECTRONICS FUNDS TRANSFER
FOR REFERENCE NUMBER 012657004
Funds are denominated in the following currencies.
    01 for USD    04 for Yen    03 for LBS
    02 for FF    05 for DM
Enter Choice of Currency followed by **
Now enter the amount to be transfered
Enter Whole number denomination followed by **
Enter fractional (cents) denomination followed by **
You have entered: Country/Currency USA Dollars
Amount to be transfered: USD 6,837 Decimal 50
Enter your PIN number _ and **
To: Bank of New York For Account Number: 6300115889
Pay To: Best Brokerage Co. Incorporated
For account: 003-123456-1
Comment: Trade purchased on 01/04/95
IF CORRECT ENTER 8*. IF INCORRECT ENTER *** TO RETRY ENTERING
Cash Movement Transaction number NYMS1689331.
COMPLETED///////
Return to Main Menu by Depressing ##
Press 0# To See Previous Screen

---

SCREEN NO. 1 - 10

---

ELECTRONIC FUNDS TRANSFER
   FOR REFERENCE NUMBER 012657004
   Cash Movement Transaction Reciept
   Date 01/04/95 Time 10:14:01 PM
   To: Bank of New York For Account Number: 6300115889
   Input Date: 01/04/95 Settlement Date: 011195
   Remit To: Best Brokerage Co. Incorporated
   For account: 003-123456-1
   Amount: USD $6,837.50
   Comment: Trade purchased on 01/04/95
   Cash Movement Transaction number NYMS1689331.
   COMPLETED///////

---

The transaction entry for cash movement generates at least two electronic messages. One to the bank via the data center's videophone interactive mailbox facility and one to the recipient of the funds based on the user's instruction profile.

Additional interested parties may be on the user's profile to facilitate messages the user wishes to address, such as an investment advisor or tax accountant or partner, etc.

The messages will be addressed to the recipients by way of the 'VIMF' video interactive mailbox facility if they are on the customer list or via the user's profile entering their fax numbers (primary and alternate) or telex (primary or alternate).

The messages themselves will carry the last sequence number that the data center stores and transmits back to the user increased by one at the start of the session when the user opens the videophone mailbox. The data center facility authenticates the videophone logged into the service for a valid electronic serial number, which is encrypted and placed into the videophone by the data center.

This encrypted electronic serial number designates the decryption routine associated for that particular phone. Each videophone message is encrypted, and the decryption routine works with additional fields to conclude and identify which routines are to be used and thereby verifies that the videophone is not a counterfeit. Only the data center will have a copy of the decryption routines housed at the data center files, which enhances the authentication process.

A small dot matrix or laser printer will be built into the videophone, so that a copy of the transactions received and sent can be retained as further proof. Transaction numbers, dates, and reference numbers can be used to review the archived messages.

The present invention defines a videophone to be any device having the capabilities to receive video/voice and/or video/text as its primary function and which, in the future, may have additional capabilities added to it that will enable it to perform functions that a PC computer performs today. Further, a videophone is defined to include cellular videophones or wireless videophones or all videophones integrated with additional PC technologies and similar capabilities (disk storage, CDs, diskettes, and memory in the megabyte range and up and/or keyboards). Any videophone that receives any kind of electronic video/voice and/or video/text or any form of video for viewing by the client and is stored on a computer facility which generates any form of video and in which the party on the videophone is not utilizing his videophone to converse and see the other calling party or parties he called in real time (both sides physically there) is also defined to be a videophone of the present invention.

Credit cards will also be a part of the payment system for purchases by the user, which will depend on the retailer or wholesaler offering that service.

In the present invention, there is an enhancement to the videophone by having a separate screen attached by a cable or wireless (FM, infrared beam, etc.), with the phone having the capability to handle two lines or more in the future to receive a video movie on that separate line or the primary line for movies on request for viewing on the videophone.

This will allow the user to request stock reports from companies of his choice to be viewed at his leisure and review his holdings and cash balances at any financial institution.

The videophone user can generate an electronic order to purchase securities and addressed to the recipient of his choice which the recipient will receive via the mailbox at the data center.

EXAMPLE NO. 2 DEPARTMENT STORES

The following is an example of how the system of the present invention is applied to a department store transaction involving the purchase and sale of a girl's dress between a user, and a department store with payment through a credit card firm, or bank transfer or other method.

---
SCREEN NO. 2 - 1
---

Welcome To Main Menu                         Index page 1 of 2
Select choice of interest by entering the number followed by the "*"
01 Videophone Interactive Mailbox
02 Department Stores
03 Resorts
04 Real Estate
05 Jewelry Stores
06 Catalogues
07 Phone number directories
08 Computer Supplies
09 Airline Schedules and Reservations
10 Restaurants and/or Reservations
Enter Number __
Depress * to Enter         Go to Next Page - Press ***

---
SCREEN NO. 2 - 2
---

Welcome To Main Menu                         Index page 2 Of 2
11 Restaurant Delivery Services
12 Hotels/Motels Cities and Reservations
13 Theater schedules and ticket information
14 Supermarket Shopping
15 Overnight Pickup/Delivery Services
16 Automobile Repair Services
17 Music Instruments Purchase/Rentals
18 Power Tool Rentals
19 Ice Rinks, Schedules, Supplies
20 Taxi and Limousine Services
Enter Number __
Depress * to Enter.        Go to previous menu enter #

The data center's main menu will always be displayed once the user enters a double pound(##) sign. This will invoke a fast call to the data center's services directory programmed on a ROM chip installed on the user's videophone. The main menu is updated and reflects all services available currently. As more services become available, they are added immediately to the main menu software along with the affiliated menu offering with the video/voice/text supplied to the data center by the vendors, such as retailers/wholesalers.

The section is clear and simple and uses the combination of an asterisk(*) to enter the selection and three asterisks(***) to scroll forward. It uses the pound key(#) to scroll backward.

Once the selection is made, the data center flashes a menu selected by the user, as shown by Screen Nos. 2-1 and 2-2. In this representation, the selection was 02, which reflects the user's request for a list of department stores.

The menu will present a screen with all of the department stores whose services have been added to the data center's system. The Screen No. 2-3 reflects all the department stores who are part of the data center service. The user only enters the department store he wishes, and the subsequent menu, as shown by Screen Nos. 2-4 and 2-5, will be the department store menu categorized by the department, which, in turn, will allow the user to select the subject of interest. The user's selection will invoke a video/voice/text session, so that the user will see the visual items, as well as a description of the item as to the materials used and can also exhibit the item by displaying a model of the displayed item in a setting if the item is furniture, tablecloth, etc., or if clothes, a boy/girl or woman/man/teenager modeling the item selected, as this enhances sales. In a department store setting, this would be prohibitively expensive. Each item would be modeled and in actuality reproduced as many times as the item is called up by the user he wishes to view.

The videos are prepared ahead of time and updated as new inventory is added. The videos would be filed in the Macy mailbox facility and will be available concurrently by as many users as necessary. This is accomplished by the data center's multiple sessions' capability of hardware and software.

Once a selection is made by the user, the screen appears, as shown by Screen No. 2-6, for payment of the item by credit card information or the funds transfer system offers that will carry the bank of his choice. If the user is in the Macy department store screen at the time he selects the payment method of his choice, the data center's system carries the Macy's bank/lockbox id for the payment transfers destination.

The payment menu is the same as the one exhibited for broker stock purchase payments. If a credit card is selected, the item number, date, and phone encryption id is validated when the user enters his information by the screen utilized for credit card payments.

As the payment Screen No. 2-6 depicts the item number selected and the size and color plus the amount plus tax, all payment options including the credit cards that the department store utilizes will be displayed. For a credit card transaction, for example, the customer enters his number and expiration date plus PIN number, where required. This is checked immediately against credit card companies for affirmation. Once approved, the information is recorded on the user's profile for his personal retrieval, and a hard copy is produced like at a point of sale terminal at stores.

---
SCREEN NO. 2 - 3
---

Welcome to Department Stores On-Line
01 Macy's FLASH  25% Discount Day on Selected Items
02 Sak's
03 Bloomingdales
04 Lord & Taylors
05 Neiman Marcus
06 Nordstroms
07 JC Penny
08 Sears
09 Burdines
10 Bergdorff Goodman
11 Henri Bendels
Enter Number __
Enter * to Select          To return to Main Menu Depress #

---
SCREEN NO. 2 - 4
---

Department Stores On-Line
MACY'S DEPARTMENT STORE
MAIN MENU
Select choice of interest by entering the number followed by the "*"
01 Mens Clothing
02 Womens Clothing
03 White Sale
04 Perfumes
05 Jewelry

SCREEN NO. 2 - 4

06 Furniture
07 Electronics Equipment (Audio/Video/Games/Cameras)
08 Hardware Department
09 Dishes, Glasses, Pots/Pans, Utensils
10 Kitchen Supplies Electronic
11 Curtains, Table Linens, Rugs
12 Other
13 Credit Card Applications
Enter Number __
Enter * to Select     To Scroll Backwards Depress ##
                          or ### for Main Menu

SCREEN NO. 2 - 5

Department Stores On-Line
MACY'S DEPARTMENT STORE
CHILDREN'S CLOTHING DEPARTMENT
Select choice of interest by entering the number followed by the "*"
01 Shirts
02 Boys/Girls Pants
03 Boys/Girls Shoes
04 Boys/Girls Sport Clothes
05 Boys/Girls Coats
06 Boys/Girls Undergarments
07 Boys/Girls Suits
08 Ties
09 Boys/Girls Dress Sport Coats
10 School Supplies
11 Toys, Electronic etc.
12 Dresses
13 Boys/Girls Misc. (sweaters, pullovers etc.)
Enter number __
Depress *. to Select     Enter # to scroll forward
                          or ### to return Main Menu

SCREEN NO. 2 - 6

Department Stores On-Line
MACY'S DEPARTMENT STORE
PAYMENT SYSTEM
You have selected item G1356 Girls dress Size 6 Color GREEN
Original purchase price $15.00 less 15% discount.
Total amount Due plus tax is AMOUNT $ (will be displayed)
Credit cards
01 Macy's
02 VISA
03 American express
04 Diners Club
05 Master Card
Enter number for selection __(Press when Done)
Enter credit card number __ (Press * when Done)
Enter expiration Date __ (Press * when Done)
Enter Pin Number __ (May not be necessary) (Press * when Done)

EXAMPLE NO. 3 RESORTS TRAVEL SERVICES

The following is an example of how the system of the present invention is applied to a resort travel service transaction involving the user choosing a resort with regard to place of stay, hotel selection, room selection, reservation placement, and payment form for the completion of the transaction with the vendor resort.

The data center's main menu will always be displayed once the user enters a double pound(##) sign, as previously described. This will invoke a fast call to the data center's services directory programmed on a ROM chip installed on the data center's videophone.

The main menu is updated and reflects all services currently available. As more services become available, they are added immediately to the main menu software along with the affiliated menu offering with the video/voice/text supplied to the data center by the vendor resort offering their services.

The selection is clear and simple and uses the combination of an asterisk(*) to enter the selection and a triple asterisk(***) to scroll forward. It uses the pound(#) key to scroll backward. Once the selection is made, the data center flashes a menu selected by the user.

In this representation, the selection was 03, which reflects the user request for a list of resort travel services for the world, as shown by Screen Nos 3-1 and 3-2.

SCREEN NO. 3 - 1

Index page 1 of 2
Welcome To Main Menu
Select choice of interest by entering the number followed by the "*"
01 Videophone Interactive Mailbox
02 Department Stores
03 Resorts
04 Real Estate
05 Jewelry Stores
06 Catalogues
07 Phone number directories
08 Computer Supplies
09 Airline Schedules and Reservations
10 Restaurants and/or Reservations
Enter Number __
Depress * to Enter          Go to Next Page - Press ***

SCREEN NO. 3 - 2

Index page 2 Of 2
Welcome To Main Menu
11 Restaurant Delivery Services
12 Hotels/Motels Cities and Reservations
13 Theater schedules and ticket information
14 Supermarket Shopping
15 Overnight Pickup/Delivery Services
16 Automobile Repair Services
17 Music Instruments Purchase/Rentals
18 Power Tool Rentals
19 Ice Rinks, Schedules, Supplies
20 Taxi and Limousine Services
Enter Number __
Depress * to Enter.        Go to previous menu enter #

The RSRT1 is evoked when the selection 03 (resorts) is depressed at the user videophone mailbox. The separate regions narrow the search for the vacationer to minimize search time and maximize resort review time, shown on screen No. 3-3 and 08* is entered, showing Screen No. 3-4. After reviewing Screen No. 3-4, giving a list of the Hawaiian Islands, the user then picks Maui and enters 03*, which then shows Screen No. 3-5, giving a listing of the vendor resorts located on the Island of Maui. The user then picks the Maui Royal Hilton and enters 01*, which then shows Screen No. 3-6, giving the user a full description of the resort and its facilities, along with daily room rates.

Entry of an asterisk(*) produces a video show of the rooms, views, and any other points of interest, as produced by the resort, with the return to Screen No. 3-6 at the end of the video for the next step instruction.

If the user wishes to make a reservation at this resort, he/she would press 01**, and Screen No. 3-7 would appear for the reservation fulfillment process, as shown on Screen No. 3-7.

SCREEN NO. 3 - 3

RSRT1
Welcome to Resorts of the World
1 USA-Northeast
2 USA-SouthEast
3 USA-NorthWest
4 USA-SouthWest
5 USA-MidWest
6 USA-Panhandle
7 USA-Purto Rico
8 USA-Hawaii
9 USA-Virgin Islands
10 USA-Alaska
11 Great Britain
12 France
13 Germany
14 Australia
Enter Number __   To return to Main Menu Depress #
Depress * to Enter

SCREEN NO. 3 - 4

RSRT 08
USA Hawaii
GENERAL AREAS
01 Honolulu
02 Maui
03 Kwai
04 Big Island
05
Go to Next Page - Press ***
SELECT
Enter Number __   Go to previous menu enter #
Depress * to Enter   Go to Main Menu enter ####

SCREEN NO 3 - 5

RSRTLOC MAUI
MAUI Resorts
HOTELS AND RESORTS
01 Maui Royal Hilton
02 Maui Concord
03 Seaside Hotel Royal
04 Maui Grande Duchesse
Go to Next Page - Press ***
SELECT
Enter Number __   Go to previous menu enter #
Depress * to Enter   Go to Main Menu enter ####

SCREEN NO 3 - 6

RSRTLOC MAUI RH
Maui Royal Hilton
DESCRIPTION
This Hotel is rated four stars by all the major traveling services.
Hotel is situated on the water with elegant services which include
seaside tents. All types of recreational equipment connecting
canals and water slides. The recreational pool has volly ball,
water weights and floats available. Food and bar service covers
entire poolside and seaside area. Tents available poolside. Eight
restuarants offering different cuisines for all palletts. Daycare is
available with exciting daily programs.
Rooms are very elegant with two size types. All rooms face the
ocean with very large elegant bath and shower.
Daily Room Rates
$375.00
$475.00
To make reservations press __
Depress * for view of rooms and ocean exposure

SCREEN NO 3 - 6

Depress 9 to return to main Hawaii menu
Depress 5 to return to main menu
Go to previous menu enter #

SCREEN NO. 3 - 7

RSRTLOC MAUI
Maui Royal Hilton
RESERVATION PAGE
Enter the date of arrival. Example 0108 ENTER __.
Enter the date of departure. Example 0117 ENTER __.
Type of Room Requested
Number of adults
Number of Children
Special rate card
Any other information requested by the resort in an entry format
conpatable with the system
SELECT
Once all selections are made   Go to previous menu enter #
Depress * to Enter and   Go to Main Menu enter ####
go to payment screen
OPTION TO GO TO VOICE RESERVATION ON LINE OR
PLACE RESERVATION ON THE RESERVATION PAGE.

Once a selection is made by the user, Screen No. 3-8 appears for payment by credit card information or the funds transfer system that the data center offers that will carry the bank of his choice. Once the user selects the payment method of his choice, the data center system carries the bank/lockbox id for the payment transfers destination.

The payment menu is the same as the one exhibited for the broker stock purchase payments. If a credit card is selected, the item number date phone encryption id is validated when the user enters his information by the screen utilized for credit card payments.

As the payment screen depicts the desired choice of resort, room options and all other options are selected. The reservation request would be routed to the hotel for affirmation. If the reservation is affirmed, the payment screen would come up. If the reservation is rejected, the reason would be displayed as an error message, and new selections would have to be made.

If payment is to be made, the affirmation page would be in the form of the payment transmission page, as shown on Screen No. 3-8. The total amount due plus tax is displayed with all payment options.

For a credit card transaction, for example, the customer enters the credit card code number, and if in the profile, his number and expiration date come up automatically, and he then enters the PIN number where required. This is checked immediately against credit card companies for affirmation. Once approved, the information is recorded on the user's profile for his personal retrieval, and a hard copy is produced like at a point of sale terminal at stores and would serve as the confirmed reservation check.

SCREEN NO. 3 - 8

Resorts On Line
ELECTRONIC FUNDS TRANSFER
You have selected (all particulars would be displayed)
Total amount Due plus tax is AMOUNT $(will be displayed)
Credit cards
01 Master Card
02 VISA -continued

SCREEN NO. 3 - 8

03 American express
04 Diners Club
05 Any Other
Enter number for selection __(Press * when Done)
Enter credit card number __ (Press * when Done)
Enter expiration Date __ (Press * when Done)
Enter Pin Number __ (May not be necessary)
(Press * when Done)

TRANSACTION FLOW CHART

Figure 6:
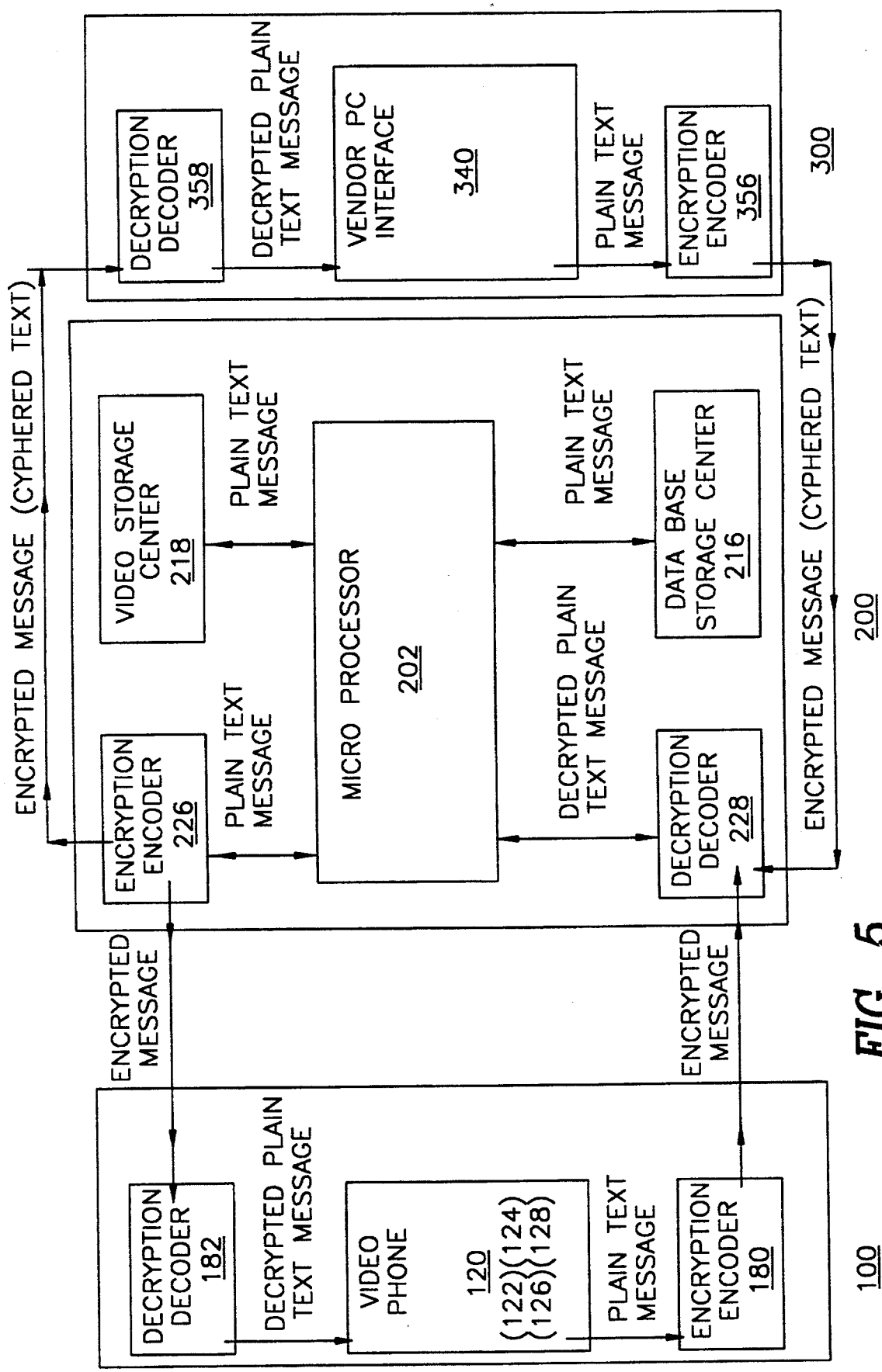
FIG. 6 is a flow chart for two transaction examples.
Figure 6A:
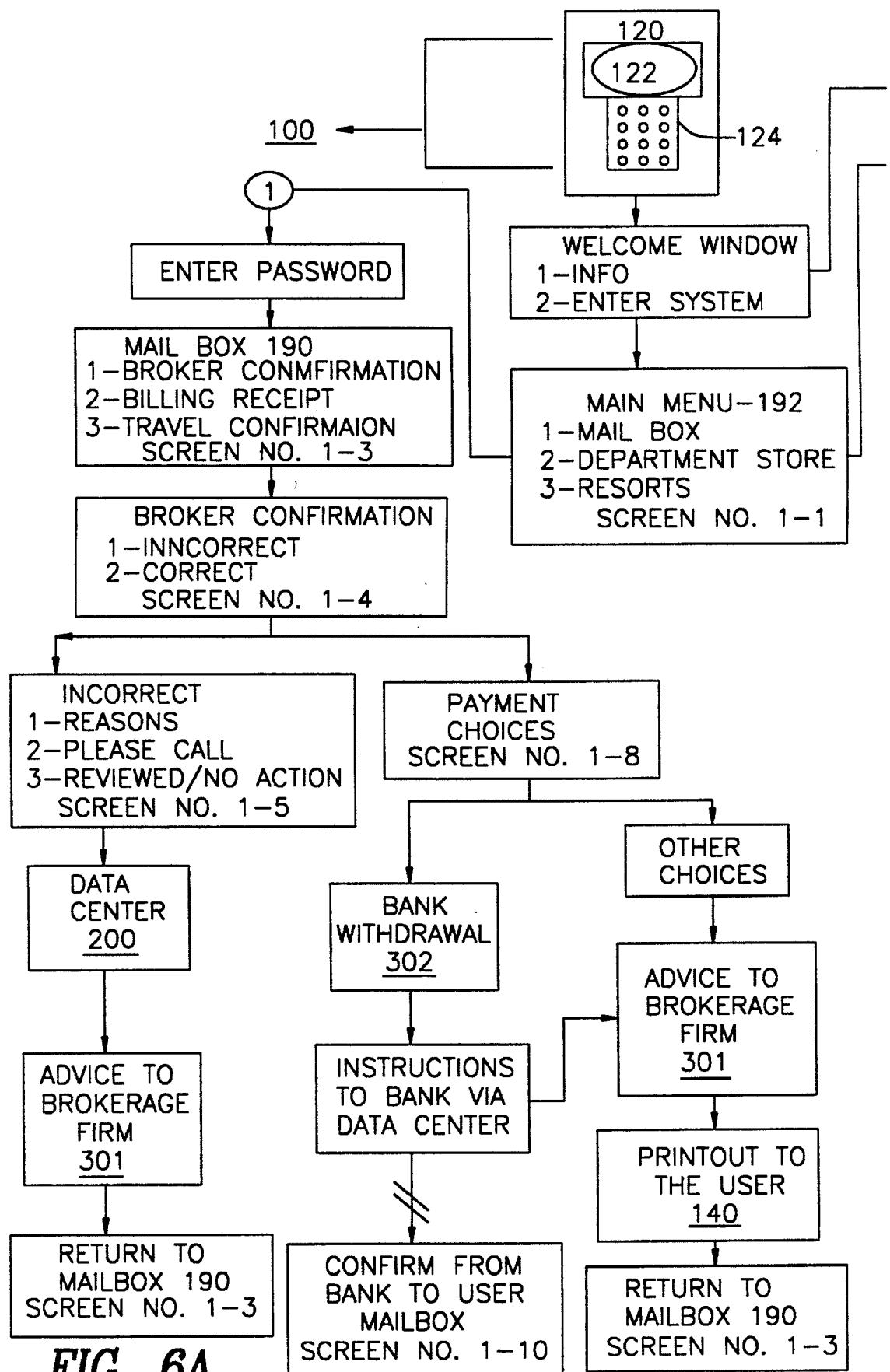
Figure 6B:
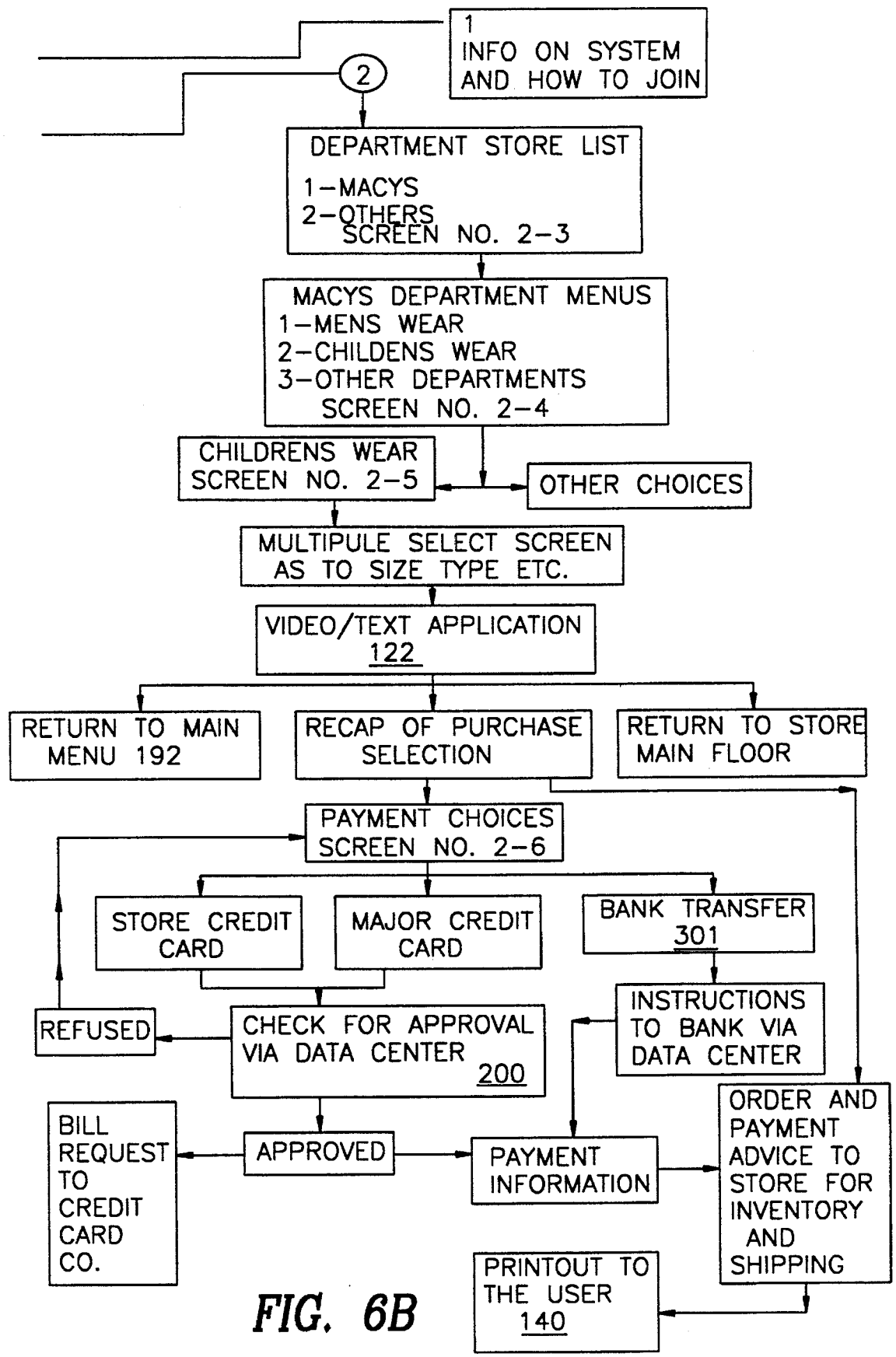

FIG. 6 shows the typical pathways of information flow for the transactions examples dealing with a brokerage firm 301 and a department store 303, starting with data entry to the expanded touch pad 130 of the user's videophone 120 and finishing with a confirmation of the transaction by a printout from printer 140 to the user.

FIG. 6 shows the sequence for a brokerage transaction by a brokerage firm 301 using the videophone system 10. The user at videophone station 100, by looking at screen 122, is informed that his/her electronic mailbox has a broker confirmation to be acted on, as shown in Screen No. 1-3. The user studies the confirmation transaction on videoscreen 122, as depicted in Screen No. 1-4, and decides if the transaction is incorrect or correct.

If the transaction is incorrect, as shown in Screen Nos. 1-5, 6, and 7, the user responds by sending an electronic response to the mailbox of data center 200, advising as to what is incorrect, or requesting the brokerage firm to call the user, or the user reviews the transaction and takes no further action. The data center 200 advises the brokerage firm 301 of the action required, and the user then goes back to the mailbox 190 for further action, if required.

If the transaction is correct, the user selects a payment choice, such as instructions to a bank via the mailbox of the data center 200, as shown in Screen Nos. 1-8 and 1-9. The bank then advises the brokerage firm 301 of the payment. The brokerage firm 301 confirms the transaction by a printout from printer 140 to the user, as shown by Screen No. 1-10, and the videoscreen 122 then returns to the mailbox 190 which completes the brokerage firm transaction. The user can then respond to other messages in the mailbox 190 or return to main menu 192.

The other transaction depicted in FIG. 6 is the use of the videophone system 10 by a user, at user station 100, to make a purchase from department store 303. The user selects which department store 303 to buy from, as shown in Screen No. 2-3, using the department store list menu on videoscreen 122. The user then selects the desired department, as shown in Screen No. 2-4, such as children's wear, shown on screen 2-5. The user then continuously scrolls the videoscreen 122 until the user selects the item of purchase wanted, such as a girl's dress. The user can then see that item and/or text related to that item on the videoscreen 122. If the user is not interested at this point, the user can return to the main menu 192, or to the store main menu for another selection, etc., as shown by Screen No. 2-3. If the user is interested in the girl's dress, a recap of the purchase selection is made on the videoscreen 122. The user then selects a payment choice, such as a store credit card, a major credit card, or a bank transfer, as shown in Screen No. 2-6. If a credit card is used, the information is given to the data center 200 for credit card approval. If the credit card is not approved, the payment choice loop is repeated. If approved, a bill request is given to the credit card company for payment to the department store 303. If a bank transfer is used, instructions are issued to the bank 302 via the data center 200. The data center 200 then sends instructions to the department store 303 on the order requested, payment advice, and how the item purchased is to be shipped, etc.

The department store confirms the order purchased by sending a printout to the user, and the user returns to the main menu 192 on videoscreen 122 which completes the department store transaction, as shown in Screen Nos. 2-1 and 2-2.

OPERATION OF SECURITY SAFEGUARDS

In operation of the videophone interactive mailbox facility system 10 where communication of information is vital between a user station 100, the data center 200, and a vendor station 300, there is a need for security safeguards of messages and transactional communications, as shown in FIGS. 5 and 6 of the drawings. In keeping messages and transactions secure against actions by unauthorized third parties, there is the use of encryption/decryption cipher microchips.

Typically, this prevents three forms of unauthorized third-party security abuse: the first being the interception and reading of a message/transaction which violates the message/transaction privacy; the second being an interception and modification of the message/transaction which is a violation of message/transaction integrity; and the third being the fabrication of a realistic-looking substitute message/transaction which is a forgery or impersonation.

FIG. 5 shows the message flow pattern from a user station 100 to a vendor station 300. For example, when a user station 100 sends a message via the data center 200 to a vendor station 300, the user station 100 has an encryption encoder cipher microchip 180 which disguises the message, so as to hide its substance, and it thus becomes a cipher text or encrypted message. The cipher text is then electronically transferred to the data center's decryption decoder cipher microchip 228, which converts the cipher text back into its original plain text (plain text is a message whose substance can be understood by mere reading) in which microprocessor 202 then records and processes the message to a proper database 216 file. The aforementioned message is then encrypted again by the data center's encryption encoder cipher microchip 226 into a new cipher text. This new cipher text is then electronically transferred to the decryption decoder cipher microchip 358 at vendor station for decryption into plain text, and the plain text message is then processed by the vendor station's 300 PC340 for an appropriate action by the vendor.

Conversely, when the reply message flows from the vendor station 300 to the user station 100, as depicted in FIG. 6, the message flow is now reversed. For example, when vendor station's 300 PC340 sends the reply message in plain text, the encryption encoder cipher microchip 356 converts the plain text reply message into cipher text, which is then electronically transferred to the data center's 200 decryption decoder microchip 228. This action converts the cipher text back into its original plain text, which microprocessor 202 records and processes the reply message to an appropriate database file 216. Then the aforementioned reply message is encrypted again by the data center's 200 encryption encoder cipher microchip 226 into a new cipher text algorithm. This new cipher text is then electronically transferred to the user's station 100 decryption decoder cipher microchip 182 for decryption into the reply message plain text. The reply message is then put on the videophone's 120 display screen 122 for the user's visual review and a hard printed copy of the reply message can be printed out by printer 140 for the user's office account records.

ADVANTAGES OF THE PRESENT INVENTION

Accordingly, the primary advantage of the present invention is that it provides a videophone interactive mailbox facility system that allows the user to view products and services by a videophone component that is easier and faster to use and less expensive than a personal computer and also more user friendly than a personal computer.

Another advantage of the present invention is that it provides to the end users a functionality of application and equipment they desire without undue complexity of learning to use a particular application and equipment for the network system.

Another advantage of the present invention is that it provides for the various vendor applications' databases and incorporation of new applications, which can be continuously and easily expanded, on an ongoing basis, at the network system's data center with information supplied by the vendor. This expansion to the system is achieved without adding to the network system's hardware at the data center already in place and without any additional burden placed on the user to use or learn the system already taught.

Another advantage of the present invention is that it provides for a network system that has state-of-the-art security safeguards for message privacy and transaction authentication by using encryption and decryption algorithm cipher microchips in hardware used by the vendor, the data center, and the subscriber. These security safeguards protect against embezzlement, fraud, and theft of services for all parties involved in the network system's day-to-day transactions and operations.

A further advantage of the present invention is that it provides for a network system that has worldwide application in all of its uses for the subscribers and/or vendors.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A videophone interactive mailbox facility system including a central data center for processing of information to conduct a transaction, comprising:

a) a user station having a videophone for viewing transaction information sent or received to conduct a transaction; an encryption encoder and a decryption decoder for safeguarding said transaction information sent or received; and means for inputting said transaction information into said videophone;

b) a vendor station having computer means for the transmission and receipt of vendor-type information to or from said central data center for conducting a transaction; an interface network for making said vendor station computer means compatible with a computer processor at said central data center; database storage components for receiving and storing said transaction information sent from said user station via said central data center; and an encryption encoder and a decryption decoder for message privacy and transaction authentication of said vendor-type information sent or received;

c) said central data center electronically connected to said user station and said vendor station and including a computer processor for centralized transmitting, receipt of and storage of said transaction information and said vendor-type information with said user station and said vendor station; said computer processor being electronically connected to one or more telephones; a display screen for monitoring said transactions; an encryption encoder and a decryption decoder for authentication of said transaction information and said vendor-type information sent or received; and a network interface for electronically connecting and making compatible said computer means at said vendor station.

2. A videophone system in accordance with claim 1, wherein said videophone further includes a memory chip for storing of said transaction information, a proprietary interface chip for interfacing with said central data center, an expanded touch pad for sending additional detailed information, and a pointer for use on the videophone monitor screen.

3. A videophone system in accordance with claim 1, wherein said user station further includes a printer for printing out said transaction information and said transactions, and wherein said means for inputting said transaction information is a touch pad.

4. A videophone system in accordance with claim 1, wherein said vendor station includes a video system for transmitting a visual representation of vendor products or services.

5. A videophone system in accordance with claim 1, wherein said vendor station computer means is electronically connected to modems, telephones, videophones, printers, and work stations for sending out said vendor-type information.

6. A videophone system in accordance with claim 1, wherein said central data center further includes buffer components for the holding of said transaction and vendor-type information to be processed.

7. A videophone system in accordance with claim 1, wherein said computer processor at said central data center is further connected to networks, modems, videophones, printers, and fax machines for the transmission of said vendor-type information and said transaction information with said user station and with said vendor station.

8. A videophone system in accordance with claim 1, wherein said central data center further includes personnel work stations for technicians and for vendor and user applications.

9. A videophone system in accordance with claim 1, wherein said central data center further includes database storage components for video transmission and for storage of said transaction information and said vendor-type information.

\* \* \* \* \*

(12) EX PARTE REEXAMINATION CERTIFICATE (7444th)
United States Patent
Davidsohn et al.

(10) Number: US 5,606,361 C1
(45) Certificate Issued: Apr. 6, 2010

(54) VIDEOPHONE INTERACTIVE MAILBOX FACILITY SYSTEM AND METHOD OF PROCESSING INFORMATION

(75) Inventors: John Davidsohn, Dix Hills, NY (US); Anthony Cinotti, Mahwah, NJ (US)

(73) Assignee: Visual Interactive Phone Concepts, Inc., New York, NY (US)

Reexamination Request:
No. 90/009,195, Jun. 19, 2008

Reexamination Certificate for:
Patent No.: 5,606,361
Issued: Feb. 25, 1997
Appl. No.: 08/438,892
Filed: May 10, 1995

(51) Int. Cl.
*G06Q 30/00* (2006.01)

(52) U.S. Cl. .............................. 348/14.01; 348/E7.081; 379/93.12; 379/93.17; 705/26
(58) Field of Classification Search .................. None
See application file for complete search history.

(56) References Cited

U.S. PATENT DOCUMENTS

| | | |
|---|---|---|
| 4,991,199 A | 2/1991 | Parekh et al. |
| 5,195,130 A | 3/1993 | Weiss et al. |
| 5,365,577 A | 11/1994 | Davis et al. |
| 5,448,285 A | 9/1995 | Kadowaki |
| 5,485,370 A | 1/1996 | Moss et al. |
| 5,495,284 A * | 2/1996 | Katz ....................... 348/14.09 |
| 5,787,403 A | 7/1998 | Randle |

FOREIGN PATENT DOCUMENTS

WO    WO94/24804    9/1994

* cited by examiner

*Primary Examiner*—Matthew Heneghan

(57) ABSTRACT

A videophone interactive mailbox facility system for processing of information to conduct a transaction which includes a user station, a vendor station, and a central data center. The user station has a videophone for viewing information sent or received to conduct a transaction; an encryption encoder and a decryption decoder for safeguarding the information sent or received; and a touch pad for inputting the information into the videophone. The vendor station has a computer for the transmission and receipt of vendor-type information to or from the central data center for conducting a transaction; and an encryption encoder and a decryption decoder for message privacy and transaction authentication of the information sent or received. The central data center is electronically connected to the user station and to the vendor station and includes a computer processor for centralized transmitting, receipt of and storage of all information and transactions with the user station and the vendor station. The computer is electronically connected to one or more telephones and includes a display screen for monitoring the transactions. Also included is an encryption encoder and a decryption decoder for authentication of the information sent or received, and a network interface for electronically connecting and making compatible the computer used by the vendor station.

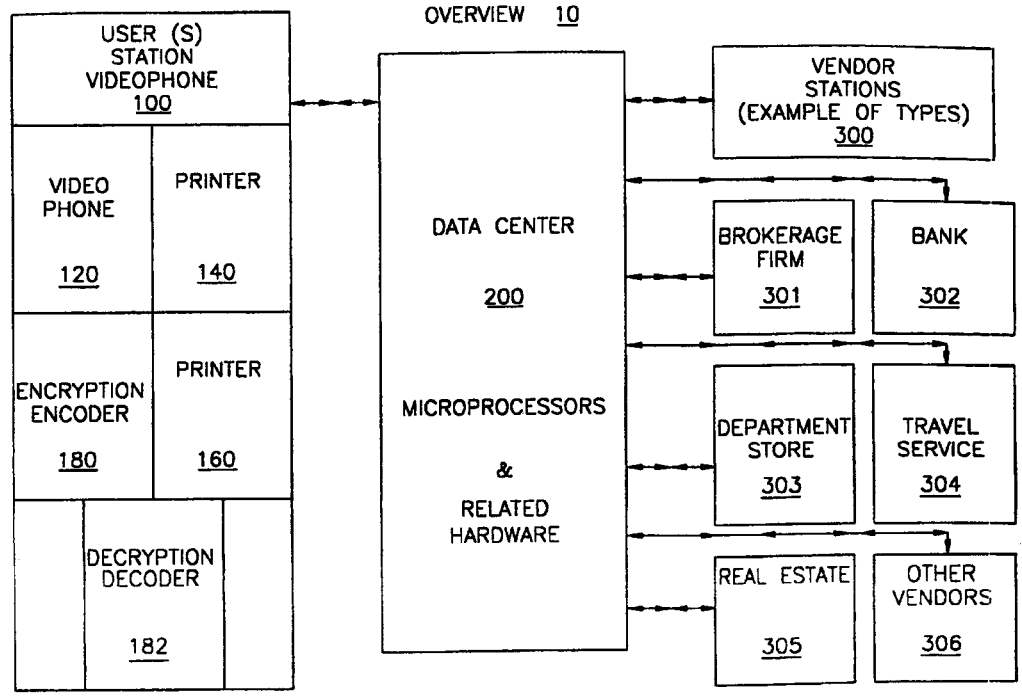

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–9, dependent on an amended claim, are determined to be patentable.

1. A videophone interactive mailbox facility system including a central data center for processing of information to conduct a transaction, comprising:
   a) a user station having a videophone *including a video screen* for viewing transaction information *and video* sent or received to conduct a transaction; an encryption encoder and a decryption decoder for safeguarding said transaction information sent or received; and means for inputting said transaction information into said videophone;
   b) a vendor station having computer means for the transmission and receipt of vendor-type *video product and service* information to or from said central data center for conducting a transaction; an interface network for making said vendor station computer means compatible with a computer processor at said central data center; database storage components for receiving and storing said transaction information sent from said user station via said central data center; and an encryption encoder and a decryption decoder for message privacy and transaction authentication of said vendor-type information sent or received;
   c) said central data center electronically connected to said user station and said vendor station and including a computer processor *connected to a video storage center* for centralized transmitting, receipt of and storage of said transaction information and said vendor-type *video product and service* information with said user station and said vendor station; said computer processor being electronically connected to one or more telephones; a display screen for monitoring said transactions; an encryption encoder and a decryption decoder for authentication of said transaction information and said vendor-type *video product and service* information sent or received; and a network interface for electronically connecting and making compatible said computer means at said vendor station.

\* \* \* \* \*

US005606361C2

(12) EX PARTE REEXAMINATION CERTIFICATE (9565th)
United States Patent
Davidsohn et al.

(10) Number: US 5,606,361 C2
(45) Certificate Issued: Mar. 14, 2013

(54) VIDEOPHONE INTERACTIVE MAILBOX FACILITY SYSTEM AND METHOD OF PROCESSING INFORMATION

(75) Inventors: John Davidsohn, Dix Hills, NY (US); Anthony Cinotti, Mahwah, NJ (US)

(73) Assignee: Visual Interactive Phone Concepts, Inc., New York, NY (US)

Reexamination Request:
No. 90/012,052, Dec. 15, 2011

Reexamination Certificate for:
Patent No.: 5,606,361
Issued: Feb. 25, 1997
Appl. No.: 08/438,892
Filed: May 10, 1995

Reexamination Certificate C1 5,606,361 issued Apr. 6, 2010

(51) Int. Cl.
*H04N 7/14* (2006.01)
(52) U.S. Cl. ............ 348/14.01; 348/E7.081; 379/93.12; 379/93.17; 705/27.1
(58) Field of Classification Search .................... None
See application file for complete search history.

(56) References Cited

To view the complete listing of prior art documents cited during the proceeding for Reexamination Control Number 90/012,052, please refer to the USPTO's public Patent Application Information Retrieval (PAIR) system under the Display References tab.

*Primary Examiner* — Luke S Wassum

(57) ABSTRACT

A videophone interactive mailbox facility system for processing of information to conduct a transaction which includes a user station, a vendor station, and a central data center. The user station has a videophone for viewing information sent or received to conduct a transaction; an encryption encoder and a decryption decoder for safeguarding the information sent or received; and a touch pad for inputting the information into the videophone. The vendor station has a computer for the transmission and receipt of vendor-type information to or from the central data center for conducting a transaction; and an encryption encoder and a decryption decoder for message privacy and transaction authentication of the information sent or received. The central data center is electronically connected to the user station and to the vendor station and includes a computer processor for centralized transmitting, receipt of and storage of all information and transactions with the user station and the vendor station. The computer is electronically connected to one or more telephones and includes a display screen for monitoring the transactions. Also included is an encryption encoder and a decryption decoder for authentication of the information sent or received, and a network interface for electronically connecting and making compatible the computer used by the vendor station.

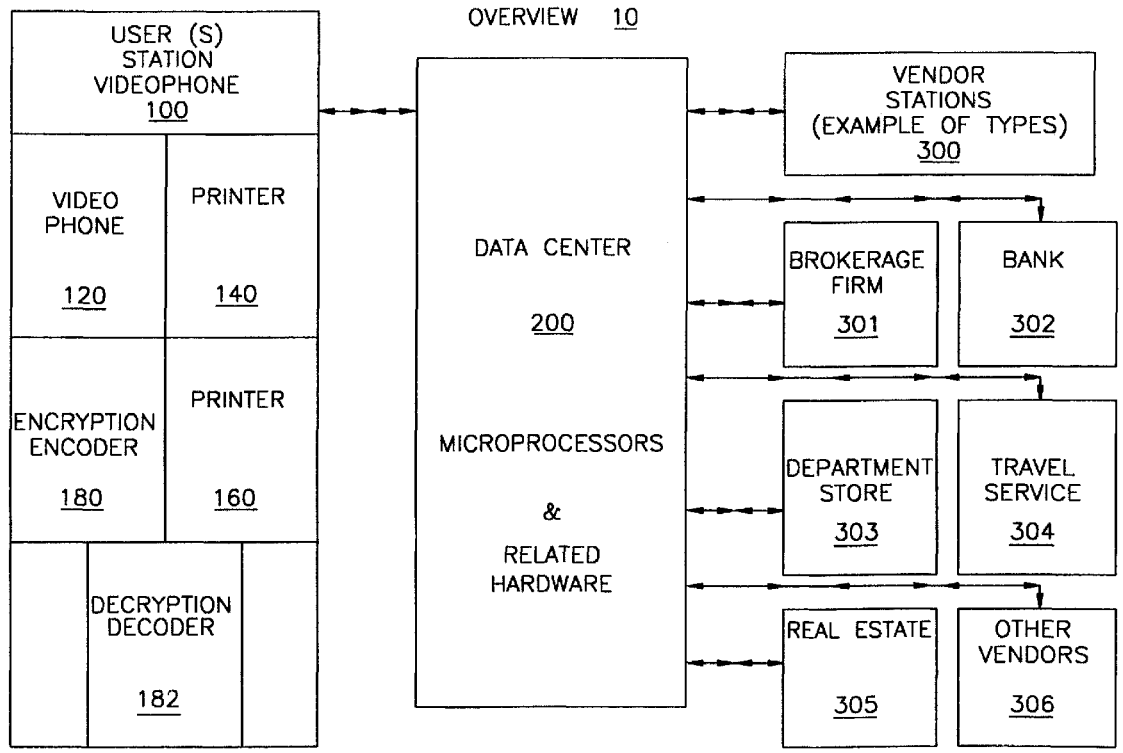

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, are determined to be patentable.

1. A videophone interactive mailbox facility system including a central data center for processing of information to conduct a transaction, comprising:
   a) a user station having a videophone including a video screen for viewing transaction information and video sent or received to conduct a transaction; an encryption encoder and a decryption decoder for safeguarding said transaction information sent or received; and means for inputting said transaction information into said videophone; *wherein said videophone is a single integrated device that includes a general purpose computer and a telephone;*
   b) a vendor station having computer means for the transmission and receipt of vendor-type video product and service information to or from said central data center for conducting a transaction; an interface network for making said vendor station computer means compatible with a computer processor at said central data center; database storage components for receiving and storing said transaction information sent from said user station via said central data center; and an encryption encoder and a decryption decoder for message privacy and transaction authentication of said vendor-type information sent or received;
   c) said central data center electronically connected to said user station and said vendor station and including a computer processor connected to a video storage center for centralized transmitting, receipt of and storage of said transaction information and said vendor-type video product and service information with said user station and said vendor station; said computer processor being electronically connected to one or more telephones; a display screen for monitoring said transactions; an encryption encoder and a decryption decoder for authentication of said transaction information and said vendor-type video product and service information sent or received; and a network interface for electronically connecting and making compatible said computer means at said vendor station.

* * * * *